(12) United States Patent
Hofmann et al.

(10) Patent No.: US 6,539,708 B1
(45) Date of Patent: Apr. 1, 2003

(54) METERING SYSTEM

(75) Inventors: Lothar Hofmann, Altenkunstadt (DE); Wieland Mathes, Michelau (DE)

(73) Assignee: Siemens Aktiengesellscahft, Munich (DE)

( * ) Notice: Subject to any disclaimer, the term of this patent is extended or adjusted under 35 U.S.C. 154(b) by 0 days.

(21) Appl. No.: 09/640,152

(22) Filed: Aug. 16, 2000

Related U.S. Application Data

(63) Continuation of application No. PCT/DE99/00419, filed on Feb. 15, 1999.

(30) Foreign Application Priority Data

Feb. 16, 1998 (DE) ......................... 198 06 265

(51) Int. Cl.$^7$ ................................................. F01N 3/00
(52) U.S. Cl. ............................ 60/286; 60/295; 60/303; 239/132.3; 239/585.1; 239/585.5
(58) Field of Search ......................... 60/286, 303, 301, 60/295; 239/132, 132.3, 88, 89, 90, 91, 92, 585.1, 585.5

(56) References Cited

U.S. PATENT DOCUMENTS

| | | | | |
|---|---|---|---|---|
| 4,854,123 A | * | 8/1989 | Inoue ........................... | 60/274 |
| 4,955,183 A | * | 9/1990 | Kolodzie et al. ............. | 60/303 |
| 5,021,227 A | * | 6/1991 | Kobayashi et al. .......... | 423/212 |
| 5,038,562 A | * | 8/1991 | Goerlich ...................... | 60/274 |
| 5,522,218 A | | 6/1996 | Lane et al. | |
| 5,605,042 A | | 2/1997 | Stutzenberger | |
| 5,643,536 A | * | 7/1997 | Schmelz ..................... | 422/105 |
| 5,771,689 A | * | 6/1998 | Bareis et al. ................. | 60/286 |
| 5,809,775 A | * | 9/1998 | Tarabulski et al. ............ | 60/274 |
| 5,826,428 A | * | 10/1998 | Blaschke ..................... | 60/303 |
| 5,992,141 A | * | 11/1999 | Breeiman et al. ............. | 60/274 |
| 6,119,448 A | * | 9/2000 | Emmerling et al. .......... | 60/274 |
| 6,192,677 B1 | * | 2/2001 | Tost ............................. | 60/286 |

FOREIGN PATENT DOCUMENTS

| | | |
|---|---|---|
| DE | 44 32 577 A1 | 3/1996 |
| DE | 44 41 261 A1 | 5/1996 |
| EP | 0 441 401 A1 | 8/1991 |
| EP | 0 558 452 B1 | 5/1995 |

* cited by examiner

Primary Examiner—Thomas Denion
Assistant Examiner—Binh Tran
(74) Attorney, Agent, or Firm—Laurence A. Greenberg; Werner H. Stemer; Ralph E. Locher

(57) ABSTRACT

A metering system in a combustion unit having an exhaust-gas chamber and a reducing agent reservoir includes an electrically controllable valve for introducing the reducing agent into the exhaust-gas chamber without using compressed air. The valve has an outlet opening that opens directly into the exhaust-gas chamber. The outlet opening is fluidically connected to the reservoir through the valve. The metering system can be produced with only little technical outlay. The metering system includes a recirculating circuit, and the valve has a holding chamber for the reducing agent. The holding chamber is disposed downstream of the outlet opening in a reducing agent flow direction, and is fluidically connected into the recirculating circuit. The metering system includes a coolant circuit for cooling the valve. The valve and its outlet opening is disposed in the exhaust-gas chamber to position the principal axis of the valve at an angle of less than 90° with respect to a principal direction of flow of exhaust gas in the exhaust-gas chamber. The metering system includes a baffle disposed in the exhaust-gas chamber to cause a change in direction of reducing agent introduced therein. The combustion unit can be a diesel engine, and the reducing agent can be a urea solution.

6 Claims, 3 Drawing Sheets

METERING SYSTEM

CROSS REFERENCE TO RELATED APPLICATION

This application is a continuation of copending International Application No. PCT/DE99/00419, filed Feb. 15, 1999, which designated the United States.

BACKGROUND OF THE INVENTION

Field of the Invention

The invention relates to a metering system for introducing a reducing agent into an exhaust-gas chamber of a combustion unit without using compressed air.

Catalytic cleaning processes can be used to remove pollutants from an exhaust gas of a combustion unit. Catalytic cleaning processes in which a pollutant, as a first reactant, reacts with a medium that is additionally introduced into the exhaust gas, as a second reactant, are used in exhaust-cleaning units that are operated using a reducing agent.

In exhaust-cleaning units that are operated using a reducing agent, the medium that is to be introduced into the exhaust-gas chamber is a reducing agent that reduces one or more pollutants in the exhaust gas. The amount of the reducing agent to be introduced into the exhaust-gas chamber depends on the amount of pollutant in question. The amount may vary at different times. The amount of reducing agent to be introduced at any one time is usually set through an electrical control unit.

If the reducing agents used are dissolved solids, in particular urea ($NH_2$—CO—$NH_2$), heating of the reducing agent may lead to evaporation and/or flocculation of individual solution constituents. Consequently, solids are left behind. Once the solids have been heated up accordingly on the parts that are in contact with the exhaust gas, they can generally no longer be removed. Residues of this nature may lead to operating disruptions in the pipe system carrying the reducing agent. For example, there is a risk that a nozzle generally used to introduce the reducing agent into the exhaust-gas chamber becomes mechanically blocked. Therefore, the heat of the exhaust-gas chamber, in which temperatures of, for example, up to 600° C. prevail, should not heat the reducing agent (which is at a temperature of, for example, ambient temperature) before it is introduced into the exhaust-gas chamber.

To prevent heating of the reducing agent, cooling compressed air generally assists with injecting the reducing agent into the exhaust-gas chamber of the combustion unit. For such purpose, European Patent 0 558 452 B1 discloses carrying out the injection with a two-fluid nozzle and, in this way, passing the required compressed air along the feed line as a coolant. The flowing compressed air also cools the nozzle that opens out into the exhaust-gas chamber. Alternatively, International PCT publication WO 96/36767 discloses mixing air and reducing agent in a premix chamber. The premix chamber is connected to the exhaust pipe through a line and a nozzle such that the hot exhaust gas cannot heat the premix chamber. Moreover, the added air prevents the reducing agent from being heated.

However, assisting the metered introduction of reducing agent into an exhaust-gas chamber of a combustion unit with compressed air requires considerable technical outlay. Moreover, during operation of such a combustion unit, in addition to controlling the metered introduction of the reducing agent into the exhaust-gas chamber, it is additionally necessary to constantly monitor a technically complex compressed-air system.

SUMMARY OF THE INVENTION

It is accordingly an object of the invention to provide a metering system that overcomes the hereinafore-mentioned disadvantages of the heretofore-known devices of this general type and that introduces a reducing agent into an exhaust-gas chamber of a combustion unit with particularly little technical outlay and operates at a particularly low monitoring level. The invention provides these characteristics by providing an electrically controllable valve, the outlet opening of which is disposed in the exhaust-gas chamber.

With the foregoing and other objects in view, in a combustion unit having an exhaust-gas chamber and a reducing agent reservoir there is provided, in accordance with the invention, a metering system, including an electrically controllable valve for introducing reducing agent into the exhaust-gas chamber without using compressed air. The valve has an outlet opening disposed in the exhaust-gas chamber, and the outlet opening is fluidically connected to the reservoir through the valve.

The invention is based on the consideration that a metering system requiring a particularly low level of monitoring in operation can be made with little technical outlay if it is possible to dispense with a technically complex compressed-air system. A technically complex compressed-air system can be dispensed with if the region between the electrically controllable blocking point in the reducing-agent line and the feed-in point of the reducing agent into the exhaust-gas chamber (which region has to be cooled by compressed air) is made particularly small. For such purpose, the outlet opening of the electrically controllable valve opens out directly into the exhaust-gas chamber.

In accordance with another feature of the invention, in order to prevent heating of the reducing agent in the regions that can be heated by the heat of the exhaust gas flowing through the exhaust-gas chamber in a particularly reliable way, a recirculating circuit for the reducing agent is advantageously provided. A holding chamber for the reducing agent, which is disposed directly in front of the valve outlet opening (downstream of the outlet opening in a reducing agent flow direction), is expediently connected into the recirculating circuit. Therefore, the reducing agent that is held in the holding chamber can be kept at a constantly low temperature, despite its proximity to the exhaust-gas chamber, because the agent is constantly recirculated. As such, there is no risk of the reducing agent evaporating and/or flocculating.

In accordance with a further feature of the invention, a coolant circuit can advantageously cool the valve. The coolant circuit may be integrated into the cooling system of the combustion unit in question. The valve may, for example, be situated in an adapter through which coolant flows. With such a configuration, the cooled valve and/or the recirculating circuit ensure(s) additional cooling of the reducing agent.

In order to bring about particularly good mixing of the reducing agent with the exhaust gas that is being carried in the exhaust-gas chamber of the combustion unit, the valve is advantageously disposed on the exhaust-gas chamber such that its principal axis includes an angle of less than 90° with the principal direction of flow of the exhaust gas in the exhaust-gas chamber. As a result, the reducing agent is entrained, in a particularly simple manner, by the exhaust gas when the agent enters the exhaust-gas chamber, thus promoting mixing.

Advantageously, the metering system also has a baffle that is disposed in the exhaust-gas chamber. The baffle is disposed such that it causes a change in direction of the reducing agent that has been introduced into the exhaust-gas chamber. The associated additional dispersion of the reducing agent in the exhaust-gas chamber is expedient, in particular, in order to bring about particularly complete reaction of the reducing agent with a number of pollutants contained in the exhaust gas.

In accordance with a concomitant feature of the invention, the metering system is advantageously used for introducing urea solution into an exhaust-gas chamber of a diesel engine. The advantages are provided because urea solution has been found, in particular, to be especially sensitive to heating. For example, such heating is imparted from the heat of the exhaust gas flowing through the exhaust-gas chamber because, in the event of individual solvent constituents of the urea solution evaporating, solids that cause operating disruptions to the metering systems may be left behind.

The introduction of urea solution is used, in particular, in the selective catalytic reduction ("SCR") process, as a precursor to ammonia ($NH_3$), which does not have a neutral odor. The SCR process is usually employed to convert nitrogen oxides ($NO_x$) to form nitrogen ($N_2$) and water ($H_2O$) with the aid of ammonia ($NH_3$) and a catalyst.

The advantages achieved with the invention include, in particular, the fact that the metering system is implemented and operated particularly simply by dispensing with a technically complex compressed-air system. It is possible to dispense with such a system by using an electrically controllable valve having an outlet opening directly into the exhaust-gas chamber. Such a configuration is associated with a particularly low technical outlay because the electrically controllable blocking point in the reducing-agent line then substantially coincides with a point where the reducing agent enters. The valve used may be a standard fuel injection valve.

Other features that are considered as characteristic for the invention are set forth in the appended claims.

Although the invention is illustrated and described herein as embodied in a metering system, it is, nevertheless, not intended to be limited to the details shown since various modifications and structural changes may be made therein without departing from the spirit of the invention and within the scope and range of equivalents of the claims.

The construction and method of operation of the invention, however, together with additional objects and advantages thereof, will be best understood from the following description of specific embodiments when read in connection with the accompanying drawings.

DESCRIPTION OF THE PREFERRED EMBODIMENTS

Figure 1:
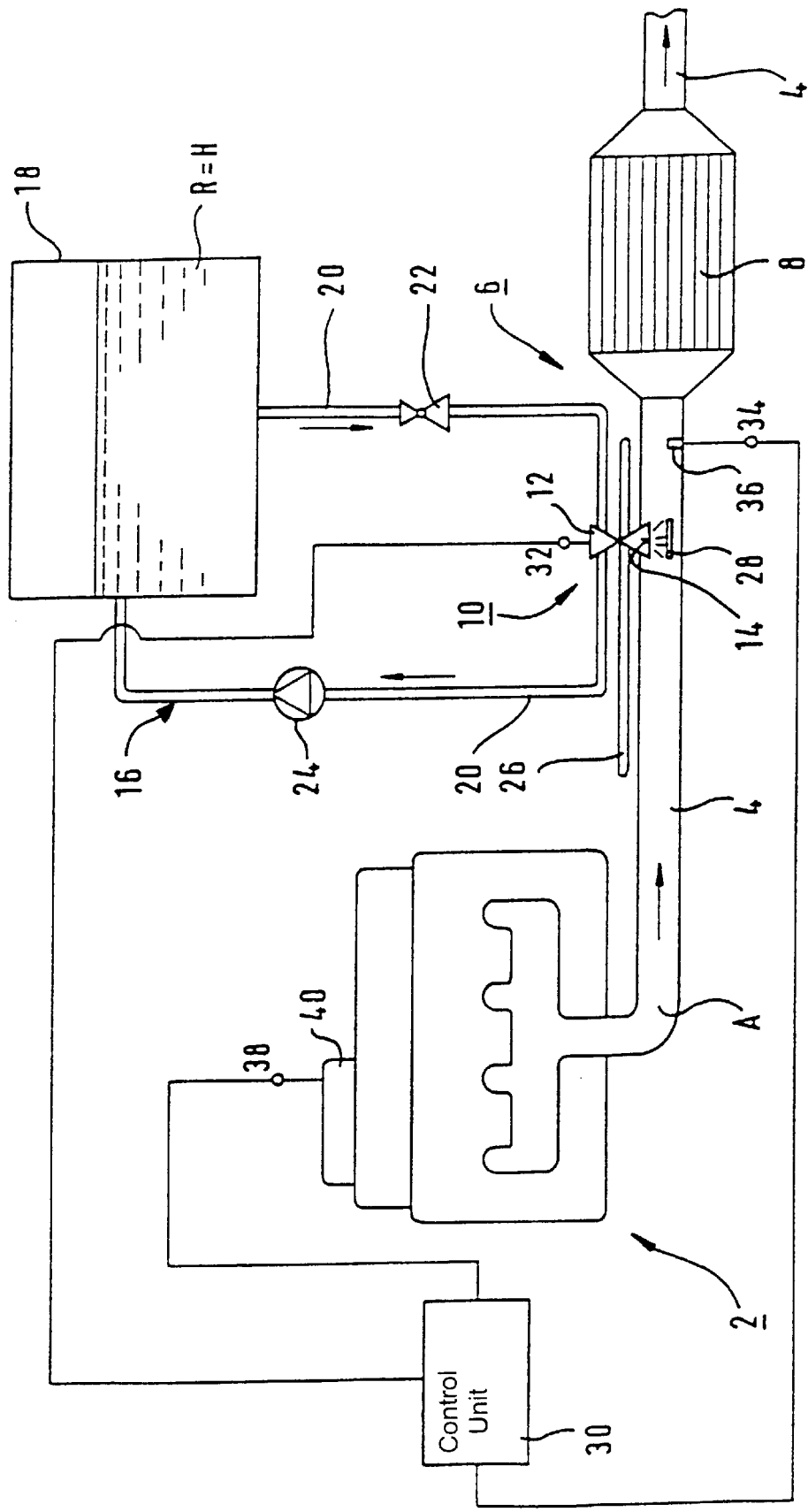
FIG. 1 is a diagrammatic, partially fragmented representation of a combustion unit having an exhaust-gas chamber to which a metering system for introducing a reducing agent is connected according to the invention.

In all the figures of the drawing, sub-features and integral parts that correspond to one another bear the same reference symbol in each case.

Referring now to the figures of the drawings in detail and first, particularly to FIG. 1 thereof, there is shown a combustion unit 2 configured as a diesel engine. The exhaust gas A that is produced during the combustion of fuel in the diesel engine and that contains pollutants passes into the environment through an exhaust-gas chamber 4 configured as an exhaust pipe. To keep the pollution levels in the environment as low as possible, an exhaust-cleaning system 6 is connected to the exhaust-gas chamber 4.

The exhaust-cleaning system 6 has a catalytic converter 8 disposed in the exhaust-gas chamber 4 and configured as a $DeNO_x$ catalytic converter. The catalytic converter 8 uses the conventional SCR process to break down nitrogen oxides ($NO_x$) with the aid of a reducing agent R that is to be additionally introduced into the exhaust-gas chamber 4 to form nitrogen ($N_2$) and water ($H_2O$). In the exemplary embodiment, the reducing agent R used is urea solution H, which in the exhaust-gas chamber 4 releases ammonia ($NH_3$), which, in turn, directly reduces the nitrogen oxides ($NO_x$).

To introduce urea solution H into the exhaust-gas chamber 4, the exhaust-cleaning system 6 includes a metering system 10. To introduce the urea solution H, the metering system 10 has an electrically controllable valve 12. The valve 12 is connected to the exhaust-gas chamber 4 such that the outlet opening 14 of the valve 12 opens out directly into the exhaust-gas chamber 4.

The valve 12 is connected into a recirculating circuit 16 provided for the urea solution H and forms part of the metering system 10. In the recirculating circuit 16, the urea solution H passes from a reservoir 18, through a system of pipes 20, to the electrically controllable valve 12. A pressure regulator 22 connected into the recirculating circuit 16 ensures a constant pressure of the urea solution H in the recirculating circuit 16. A pump 24 is connected into the recirculating circuit 16 to constantly recirculate the urea solution H.

In addition, the electrically controllable valve 12 can be cooled through a coolant circuit 26 connected to a coolant system already present in the diesel engine 2.

The metering system 10 furthermore includes a baffle 28 disposed in the exhaust-gas chamber 4. The baffle 28 causes a change in direction of the urea solution H that has been introduced into the exhaust-gas chamber 4. The change in direction causes a particularly homogeneous dispersion of the urea solution H in the exhaust-gas chamber 4 of the combustion unit 2. As a result, particularly complete reaction of the urea solution H with the nitrogen oxides ($NO_x$) of the exhaust gas A is ensured.

The metering system 10 is configured for electrically controllable metering of the urea solution H into the exhaust-gas chamber 4 of the combustion unit 2 as a function of the mass flow rate of the nitrogen oxides ($NO_x$). For such a purpose, the electrically controllable valve 12 and a control unit 30 of the exhaust-cleaning system 6 are connected to one another through an electrical terminal 32. In the exemplary embodiment, the electrical terminal 32 is connected to a contact of the, control unit 30 that is present in any case and is not otherwise occupied. A control unit contact of this type, which is not otherwise occupied, is usually present in a diesel engine of a passenger car.

To control the mass flow rate of the nitrogen oxides ($NO_x$), the control unit 30 is connected, through an electrical terminal 34, to a measurement device 36 disposed in the exhaust-gas chamber 4 and, through an electrical terminal 38, to an electric injection fitting 40 for fuel for the combustion unit 2. Without control, the mass flow rate of the nitrogen oxides ($NO_x$) would be subject to considerable fluctuations because even slight fluctuations in the load or rotational speed of the combustion unit 2 can bring about a considerable change in the mass flow rate. Therefore, a metering system provided for uncontrolled mass flow of the nitrogen oxides ($NO_x$) would have to be highly dynamic and configured to operate accurately within wide operating ranges of the combustion unit 2. With a controlled mass flow rate, there is no need to impose such demands on the metering system 10.

Figure 2:
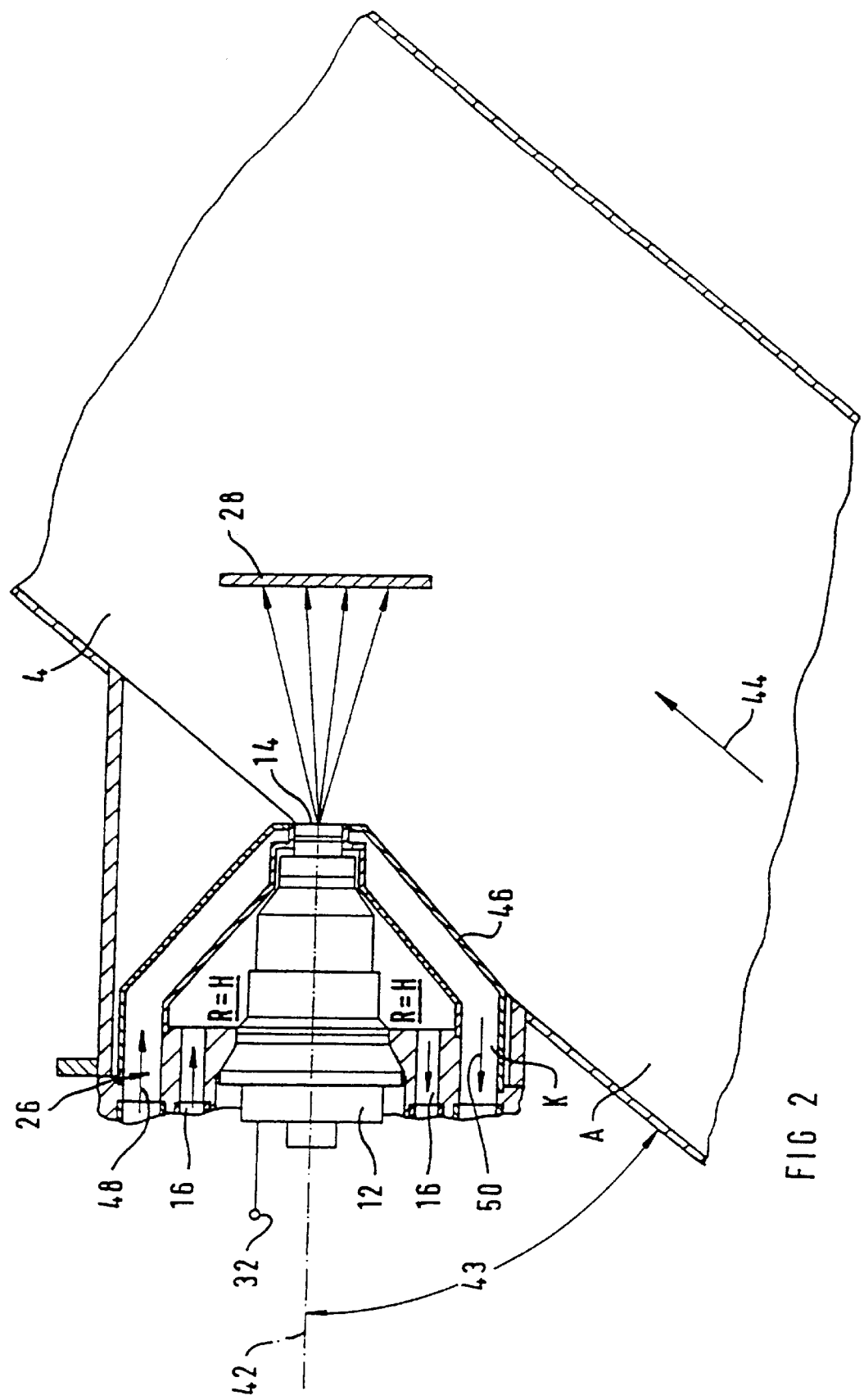
FIG. 2 is an enlarged, fragmentary, cross-sectional view of an electrically controllable valve of the metering system shown in FIG. 1, with the valve directly attached to the exhaust-gas chamber.

As illustrated in detail in FIG. 2, the outlet opening 14 of the electrically controllable valve 12 opens out directly into the exhaust-gas chamber 4. The valve 12 of the metering system 10, which can be electrically controlled through the terminal 32, is disposed on the exhaust-gas chamber 4 such that its principal axis 42 includes an angle 43 of approximately 45° with the principal direction of flow 44 of the exhaust gas A in the exhaust-gas chamber 4. The configuration effectuates a particularly good transportation of the urea solution H that has been introduced into the exhaust-gas chamber 4 in the principal direction of flow 44 of the exhaust gas A, resulting in a particularly favorable mixing of the urea solution H with the exhaust gas A.

Urea solution H can flow around some of the electrically controllable valve 12 that is connected into the recirculating circuit 16. Moreover, the valve 12 is disposed on the exhaust-gas chamber 4 through an adapter 46 through which coolant K flows. The adapter 46 is connected into the coolant circuit 26 and is connected to the coolant circuit 26 through a coolant inlet 48 and a coolant outlet 50. Thus, the valve 12 can be cooled indirectly through the coolant K flowing through the adapter 46 and directly through the urea solution H. The baffle 28 of the metering system 10 is disposed in the exhaust-gas chamber 4 such that it causes a change in direction to the urea solution H that has been introduced into the exhaust-gas chamber 4.

Figure 3:
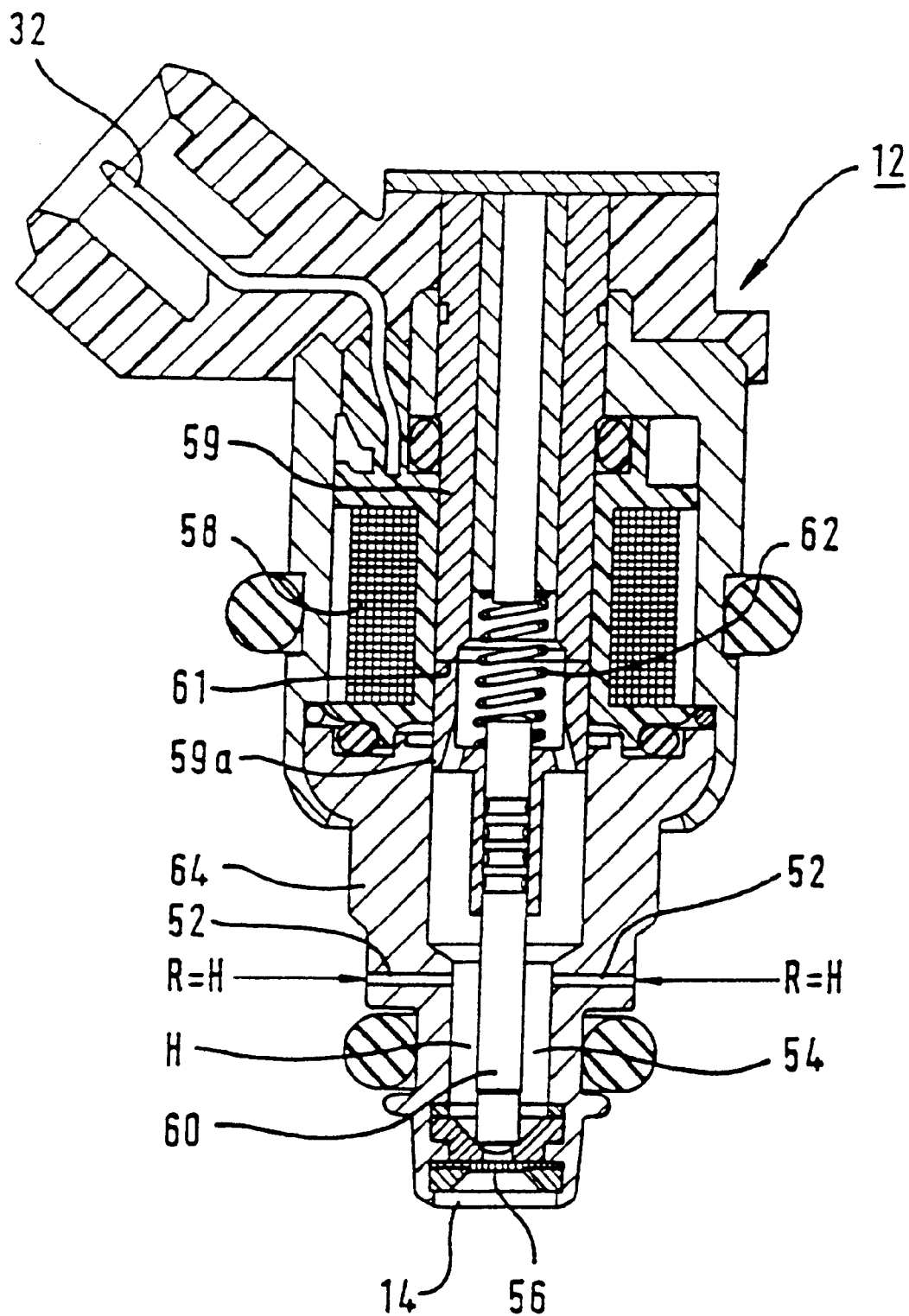
FIG. 3 is a longitudinal, cross-sectional view through the electrically controllable valve of the metering system shown in FIG. 1.

FIG. 3 shows a longitudinal section through an alternative embodiment of the electrically controllable valve 12. The electrically controllable valve 12 is connected into the recirculating circuit 16 through a side feed 52 for the urea solution H, which is provided as the reducing agent R. A holding chamber 54, which is provided for the urea solution H and is mounted in front of the outlet opening 14 of the electrically controllable valve 12, is connected to the feed 52. A screen 56 that produces homogeneous distribution of the urea solution H introduced into the exhaust-gas chamber 4 is disposed directly in front of the outlet opening 14 of the valve 12.

The valve 12 is electromagnetically operated. A magnet coil 58 of the valve 12 is connected to the control unit 30 of the exhaust-cleaning system 6 through the electric terminal 32. If the magnet coil 58 is carrying a current, a magnetic field is generated for lifting up the valve rod 60 of the valve 12, which is connected to the bottom part 59a of the cylinder 59. Lifting of the valve rod 60 opens the valve 12, approximately closes the parting gap 61, and compresses a restoring spring 62. When the current to the coil is switched off, the restoring spring 62 guides the valve rod 60 back into its rest position, in which it closes off the valve 12.

Further details on the configuration of the valve 12 are illustrated in a conventional way in FIG. 3 and are not explained in more detail here. The electrically controllable valve 12 illustrated here is a foot-fed valve because the "foot" 64 of the valve 12 has urea solution H flushing around it. In this context, the "foot" of a valve refers generally to the outlet region of the valve. As an alternative, it is also possible to use a head-fed valve, in which the urea H is supplied through the "head". Both types of valves are conventional components and are usually provided for fuel injection in internal combustion engines. In the exemplary embodiment, the components of the valve 12 are configured such that they cannot be destroyed by chemically degradation by urea solution H. In other words, the components of the valve 12 are able to withstand urea solution H and/or its decomposition products.

The exhaust-cleaning system 6 of the combustion unit 2 reduces nitrogen oxides ($NO_x$) with the aid of ammonia ($NH_3$) and the $DeNO_x$ catalytic converter 8 to form nitrogen ($N_2$) and water ($H_2O$). During operation of the exhaust-cleaning system 6, as a precursor to ammonia ($NH_3$), which does not have a neutral odor, the metering system 10 introduces urea solution H into the exhaust-gas chamber 4. The urea solution H is metered as a function of the controlled mass flow rate of the nitrogen oxides ($NO_x$). The urea solution H is introduced in electromagnetically-controlled cycles. For introduction, current is fed to the magnet coil 58 through the electrical terminal 32 to generate a magnetic field. The magnetic field lifts the valve rod 60 and compresses the spring 62. The pressure that prevails in the recirculating circuit 16 for the urea solution H then causes the urea solution H to leave the valve 12 and pass into the exhaust-gas chamber 4. If the electrical terminal 32 interrupts the feed of current to the magnet coil 58, the magnetic field that has previously been formed disappears. The restoring spring 62 returns the valve rod 60 to its rest position and, thus, closes the valve 12. It is, thus, possible to open and close the valve 12 in electromagnetically-controlled cycles.

Moreover, the metering system 10 is configured, with particular reliability, to prevent heating of the urea solution H in the regions that can be heated by the heat of the exhaust gas A flowing through the exhaust-gas chamber 4. First, the urea solution H is recirculated through the recirculating circuit 16. Second, the coolant circuit 26 cools the electrically controllable valve 12.

Therefore, the combustion unit 2 has a metering system 10 that has a particularly low technical outlay and, during operation, only requires monitoring of the metered introduction of the urea solution H into the exhaust-gas chamber 4. By using an electrically controllable valve 12, the outlet opening 14 of which opens out directly into the exhaust-gas chamber 4, it is possible to dispense with a technically complex compressed-air system. In addition, the metering system 10 is configured such that the electrically controllable blocking point of the valve 12 directly coincides with the feed-in point of the reducing agent R. As a result, the region between these two points, which usually has to be cooled by compressed air, is no longer present. The risk of the urea solution H becoming heated, resulting in evaporation and/or flocculation of individual constituents of the solution, is kept at a particularly low level. At the same time, a technically complex compressed-air system is eliminated.

We claim:

1. In a combustion unit having an exhaust-gas chamber with an interior defined by a wall surface and having a reducing agent reservoir, a metering system, comprising:

an electrically controllable valve for introducing reducing agent into the exhaust-gas chamber without using compressed air; and an outlet opening being a part of said valve and connected directly to said valve without any interconnecting line, said outlet opening being disposed directly at the wall surface of the exhaust-gas chamber, said outlet opening being fluidically connected to the reducing agent reservoir through said valve.

2. The metering system according to claim 1, including a recirculating circuit, said valve having a holding chamber for the reducing agent, said holding chamber being disposed downstream of said outlet opening in a reducing agent flow direction, and said holding chamber being fluidically connected into said recirculating circuit.

3. The metering system according to claim 1, including a coolant loop for cooling said valve.

4. The metering system according to claim 1, wherein said valve has a principal axis and said valve and said outlet opening are disposed in the exhaust-gas chamber to position said principal axis at an angle of less than 90° with respect to a principal direction of flow of exhaust gas in the exhaust-gas chamber.

5. The metering system according to claim 1, including a baffle disposed in the exhaust-gas chamber to cause a change in direction of reducing agent introduced into the exhaust-gas chamber.

6. In a diesel engine having an exhaust-gas chamber with an interior defined by a wall surface and having a urea solution reservoir, a metering system, comprising:

an electrically controllable valve for introducing urea solution into the exhaust-gas chamber without using compressed air; and an outlet opening being a part of said valve and connected directly to said valve without any interconnecting line, said outlet opening being disposed directly at the wall surface of the exhaust-gas chamber, said outlet opening being fluidically connected to the urea solution reservoir through said valve.

* * * * *